May 6, 1969
D. H. SOLOMONSON
3,442,410
TURNTABLE APPARATUS
Filed Dec. 5, 1966
Sheet 1 of 3
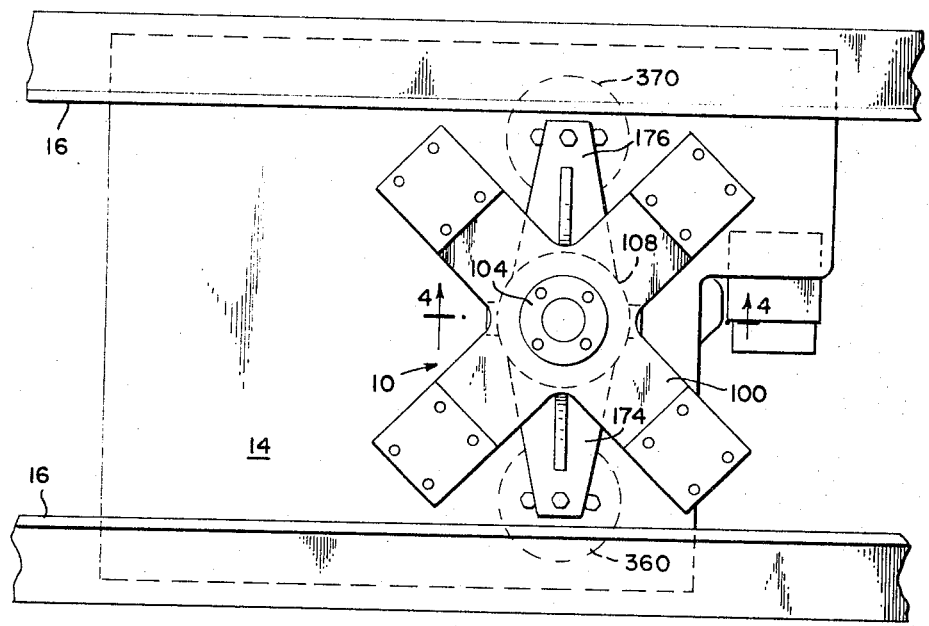
FIG__1
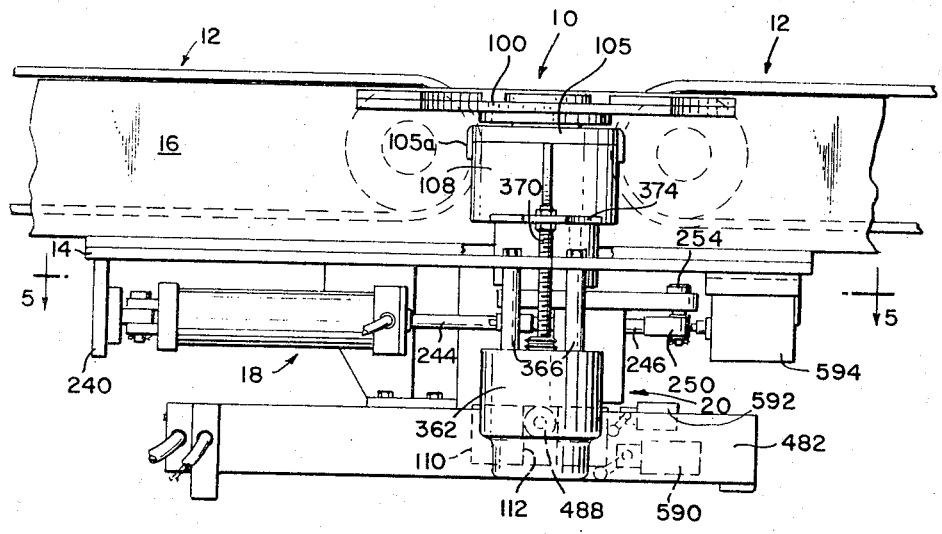
FIG__2
DANIEL H. SOLOMONSON
INVENTOR.
BY
ATTORNEYS May 6, 1969     D. H. SOLOMONSON     3,442,410
TURNTABLE APPARATUS
Filed Dec. 5, 1966
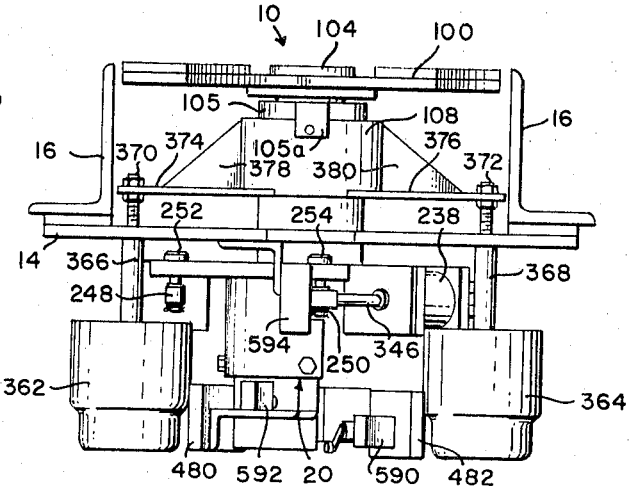
FIG__3
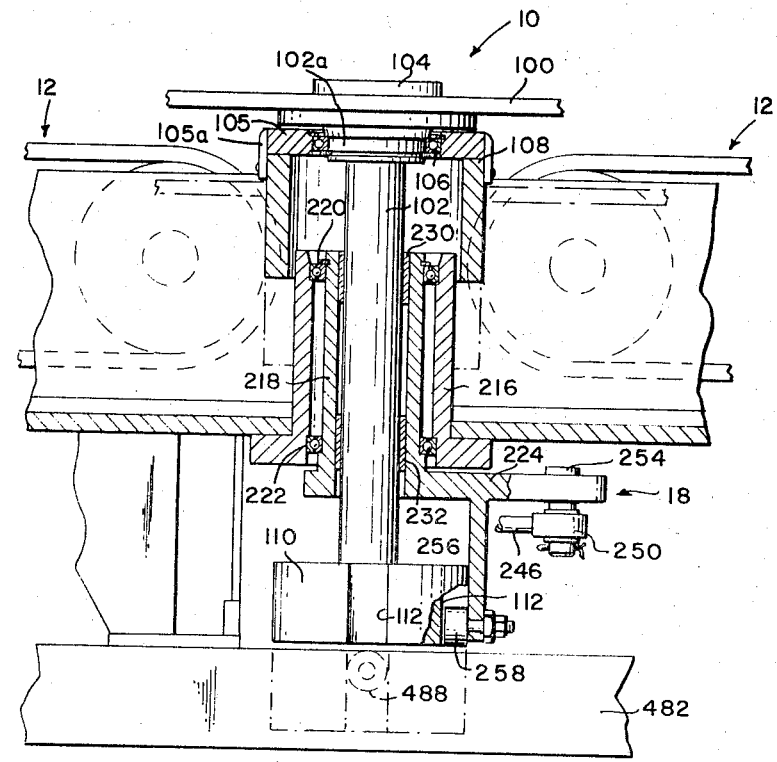
FIG__4
DANIEL H. SOLOMONSON
INVENTOR.
ATTORNEYS

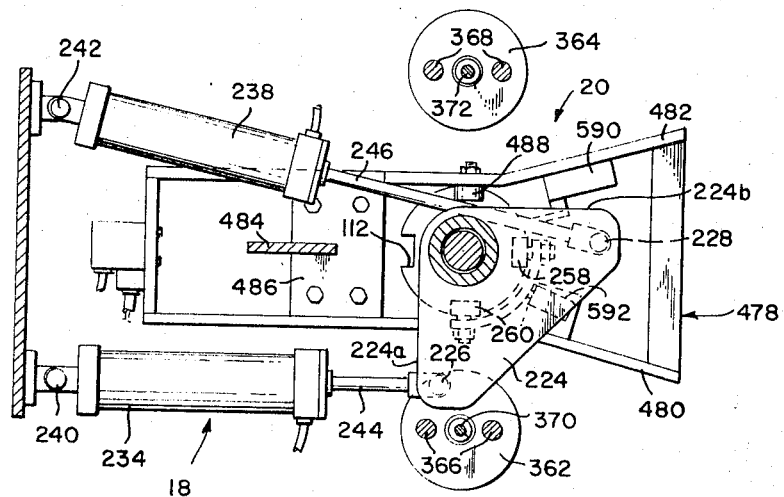
FIG __ 5
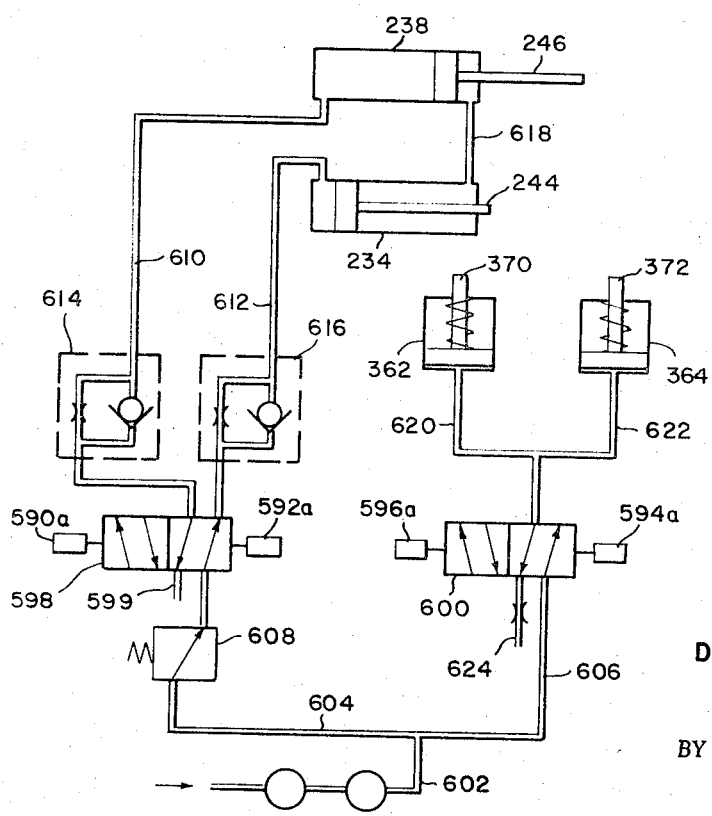
FIG __ 6
DANIEL H. SOLOMONSON
INVENTOR.
BY
ATTORNEYS

United States Patent Office 3,442,410
Patented May 6, 1969

3,442,410
TURNTABLE APPARATUS
Daniel H. Solomonson, Port Townsend, Wash., assignor to Lamb-Grays Harbor Co., Inc., Hoquiam, Wash., a corporation of Washington
Filed Dec. 5, 1966, Ser. No. 599,048
Int. Cl. B66f 9/14; B65g 47/22
U.S. Cl. 214—730                                        6 Claims

ABSTRACT OF THE DISCLOSURE

A pulp bale turning apparatus is provided with turntable rotating means that control the acceleration and deceleration of the turntable during a turning cycle through the inner action of fluid operated cylinders attached to a crank assembly. The turntable is adapted to be raised to lift an object to be rotated above the plane of conveyor line, such that the object may be rotated in raised position and then lowered back onto the conveyor line. An indexing arrangement is provided whereby the turntable may be rotated only in raised position, with the turntable rotating means being permitted to recycle to its original position after the turntable is lowered without rotating the turntable.

---

This invention relates to turntable apparatus adapted to be positioned in a conveyor line for rotating objects. More particularly, this invention relates to such turntable apparatus for rotating paper pulp bales in a conveyor line.

Turning pulp bales, as required, for example, to wire tie them both lengthwise and crosswise, presents difficult inertia problems. Although it is desirable to rotate such an object in as short a time as possible, no bale slippages on the turntable can be tolerated. Thus, turntable acceleration and deceleration must be carefully controlled.

A primary object of this invention is to provide a turning apparatus wherein acceleration and deceleration control is effected through the interaction of cylinders and cylinder rod assemblies attached to a crank assembly. A further object is to provide apparatus for turning objects such as pulp bales in a minimum amount of time with no slippage. Another object is to provide means for raising a turntable under an object, and then lower the object back onto the conveyor line automatically in a minimum amount of time. A further object is to provide an indexing arrangement whereby a turntable is rotated only when in a raised position such that the turntables will not interfere with adjacent components of the conveyor line.

These and other objects and advantages will become apparent from the following description and the accompanying drawings, of which:

FIG. 1 is a plan view of one embodiment of the apparatus of this invention;

FIG. 2 is a side elevation of the FIG. 1 apparatus;

FIG. 3 is an end elevation of the FIG. 1 apparatus, looking from the right end of FIG. 1 toward the center;

FIG. 4 is a vertical cross-section taken along the line 4—4 in FIG. 1;

FIG. 5 is an intermediate plan view taken along the line 5—5 in FIG. 2; and

FIG. 6 is a pneumatic diagram of an exemplary control system for the apparatus of the invention.

The turning apparatus of this invention comprises two cylinder assemblies, the cylinder rods of which are drivingly connected to a pivot lever member. By this arrangement, the lever action versus cylinder rod speed can be such that, when turning the lever member, one cylinder starts the rotational motion and the other cylinder controls the stopping of such motion. When supply fluid, air or hydraulic fluid, is supplied to the blind end of one cylinder to extend its cylinder rod and rotate the lever member, for example, fluid is restrictively exhausted from the blind end of the other cylinder as its cylinder rod is retracted by the rotating levers. By appropriate angular location of the levers relative to the respective cylinder rods, maximum leverage can be exerted to initiate rotation, such leverage gradually decreasing as rotation continues, and leverage opposing rotation. Thus, the resultant effect is a slow initial angular velocity, a fast intermediate angular velocity and a slow terminal angular velocity, providing non-slipping rotation of the object-to-be-rotated in a minimum amount of time.

The turntable rotating assembly of this invention comprises a turntable adapted to be located in a conveying line and to be raised under an object to lift it free of the conveyor and to be lowered to deposit the object back onto the conveyor, a turntable rotating assembly adapted to rotate the turntable when it is in a raised position, and a turntable raising and lowering assembly adapted to raise and lower the turntable. The turntable rotating assembly is designed to rotate the turntable with an object thereon, such as a pulp bale, a certain number of degrees, such as 90°, in as short a time as possible with no slippage.

With reference to the figures, this invention comprises a turntable assembly 10 mounted in a conveyor line 12 by a plate 14 which is suspended between two angle irons 16—16. A turntable rotating assembly 18, and a turntable raising and lowering assembly 20 are also supported by plate 14.

The assembly 10, as best seen in FIGS. 1, 2 and 4, comprises a turntable 100 axially encloses the upper end 104 of a vertical traverse rod 102 as is mounted on an enlarged upper end section 102a of the traverse rod 102. Section 102a is designed to be enclosed and supported by a bearing ring assembly 106. Bearing ring assembly 106 is axially contained in a housing 105 that rests on lift cylinder 108 and is retained there by side dips 105a. The lower end of traverse rod 102 is provided with an axially connected index cylinder on plate 110 which has four longitudinal indexing races 112 in its periphery spaced at 90° intervals.

The turntable rotating assembly 18, as best seen in FIGS. 2, 4 and 5, comprises a fixed vertical cylinder 216 extending upwardly through plate 14 with a flanged lower end welded to the underside of plate 14, and a smaller, axially rotatable cylinder 218 supported concentrically within fixed cylinder 216 by upper and lower bearing ring assemblies 220 and 222. Cylinder 218 concentrically enclosing the intermediate section of traverse rod 102. The lower end of rotatable cylinder 218 is flanged into a lever plate 224 having perpendicular lever arm sections extending parallel to perpendicular plate edges 224a and 224b from the axis of traverse rod 102 to pivot points 226 and 228. Upper and lower bushings 230 and 232 are fitted within the interior of rotatable cylinder 218 and bear against and guide traverse rod 102. The assembly 18 also comprises two pneumatic cylinders 234 and 238 that are pivotably connected at their blind ends to supports 240 and 242 which depend from plate 14. The spacing between supports 240 and 242 must be such that the rods 244 and 246, when retracted, provides for exact 90° rotation and alignment of longitudinal races 112 of the index cylinder 110, with cam followers 488, 258 and 260. The respective cylinder rods 244 and 246 are provided with bushings 248 and 250, respectively, which are pivotally connected to the lever plate 224 at pivot points 226 and 228, respectively, through depending pins 252 and 254 respectively. An indexing quadracylinder 256 depends from lever plate 224 and is provided with two cam followers 258 and 260, rotatable about horizontal axis and spaced 90° apart at the lower edge, which are adapted to ride in the indexing races 112 in the index cylinder 110.

The turntable raising and lowering assembly 20, as best seen in FIGS. 1, 2, 3 and 5, comprises two diaphragm-type pneumatic chambers 362 and 364 that are suspended from plate 14 by pairs of spacers 366 and 368, respectively, bolted to the plate 14. The chamber 362 and 364 have upwardly extending piston rods 370 and 372, respectively, bolted at their upper end to diametrically opposed lift arms 374 and 376, respectively. The lift arms 374 and 376 are welded to the base of lift cylinder 108 and reinforced by vertical diametrically-opposed triangular members 378 and 380 which are welded to the lift cylinder 108 and to the respective lift arm 374–376.

A yoke frame 478 comprising side bars 480 and 482 is suspended from plate 14 below the turntable rotating assembly by a vertical bar 484 which is welded to the underside of plate 14 and to a cross-member 486 extending between side bars 480 and 482. Each side bar 482 is provided with a cam follower 488, rotatable about a horizontal axis, that is positioned below the elevation of the cam followers 258 on quadracylinder 256, and which is adapted to ride in the longitudinal races 112 of the index cylinder 110. This is to assure that the traverse rod 102 and yoke frame 478 will not receive a bending load in case of system failure.

Three control microswitches are provided with actuating arms for controlling the operation of the system described above. One switch 590 is mounted on the yoke bar 482 and has an actuating arm with a roller at the end for actuating the switch when the index plate 110 is in a lowered position as shown in dotted line in FIGS. 2 and 4. Another switch 592 is mounted on the yoke bar 480 and has an actuating arm with a roller at the end for actuating the switch when the index plate 110 is in a raised position as shown in solid line in FIG. 4. A third switch 594 is mounted on the underside of plate 14 and has a plunger actuator for actuating the switch when the lever plate 224 has completed its rotation in raised position. These switches, and a fourth switch mounted on the conveyor 12 and not shown, control double solenoid-operated four-way, two-position spool valves 598 and 600 shown in FIG. 6. Switches 590 and 592 control the solenoids 590a and 592a, respectively, for valve 598. Switch 594 mounted on plate 14 and the fourth switch mounted on the conveyor 14 control the solenoids 594a and 596a, respectively, for the valve 600.

The exemplary pneumatic control system of FIG. 6 is designed to pass pressurized air in line 602 to valves 598 and 600 through branch lines 604 and 606, respectively, branch line 604 having a pressure regulator 608 therein. Regulator 608 controls the mechanism smoothness and speed. Pressurized air is passed through valve 598 to the blind ends of either cylinder 234 or cylinder 238 through lines 610 or 612, respectively, depending on the spool position in valve 598. Lines 610 and 612 are provided with flow control check valves 614 and 616, respectively, which permit unrestricted flow to and restricted flow from the respective cylinders. Exhaust air from the blind ends of either cylinder leaves valve 598 through line 599. The cylinder rod ends of the cylinders 234 and 238 are interconnected by a line 618 to exclude dust and moisture from the cylinders. Pressurized air is passed to or from both pressure chambers 362 and 364 through valve 600 and lines 620 and 622, respectively. Exhaust air from chambers 362 and 364 leaves valve 600 through restricted flow line 624.

The system described above operates as follows. When an object to be rotated, such as a pulp bale, is conveyed toward the rotating station and actuates a switch on the conveyor 12, solenoid 596a actuates valve 600 such that supply air passes to chambers 362 and 364. The lift cylinder 108 is thus raised, through rods 370 and 372 raising arms 174 and 176 that are connected to lift cylinder 108.

The raising of lift cylinder 108 also raises traverse rod 102 journalled thereto by bearing assembly 106 and turntable 100 attached to traverse rod 102. The raising of traverse rod 102 also raises index plate 110 from the dotted line position shown in FIG. 4 into the quadracylinder 256 with rollers 258 riding in the races 112 of index plate 110. Index plate 110 and traverse rod 102 rise to the extent permitted by the chambers 362 and 364 and are held in the raised position by pressurized air. The elevation of the turntable 100 in raised position must be sufficient to lift the pulp bale free of the conveyor 12.

When in the raised position, the index plate 110 has risen out of contact with the actuating arm of switch 592, thereby actuating switch 592 and its solenoid 592a. Actuation of solenoid 592a shifts the spool of valve 598 (as shown in FIG. 6) so that supply air passes to the blind end of cylinder 234 to extend its cylinder rod 244. Extension of cylinder rod 244 rotates the lever plate 224 and quadracylinder 256 attached thereto, counter clockwise. Since the rollers 258 are within the races 112 of the raised index plate 110, rotation of the quadracylinder 256 also rotates index plate 110 and traverse rod 102, thereby rotating turntable 100 on top of traverse rod 102.

When the cylinder rod 246 of cylinder 238 is fully extended, the pivotal bearing 248 at its outer end contacts the plunger of switch 594 thereby actuating switch 594 and its solenoid 594a. Actuation of solenoid 594a shifts the spool of the valve 600 so that air is exhausted from chambers 362 and 364 thereby effecting the lowering of turntable 100. As turntable 100 lowers, the races 112 of index plate 110 pass out of registry with rollers 258 on quadracylinder 256 and into registry with rollers 488 on yoke bar 482. When index plate 110 is lowered to its fullest extent to the position shown in dotted line in FIG. 4, the actuating arm of switch 590 is contacted by index plate 110 and actuates switch 590 and its solenoid 590a. Actuation of switch 590a shifts the spool of valve 598 so that supply air passes to the blind end of cylinder 238 and effecting the retraction of cylinder rod 244 back to its original position. Since index plate 110 is lowered out of registry with rollers 258 and 260 and into registry with rollers 488, the rotation of quadracylinder 256 back to its original position as cylinder rod 244 is retracted does not effect the rotation of turntable 100.

In the usual pulp bale conveying installation, the conveyor drive chains and the like will be so located that the turntable 100 cannot rotate in a lowered position and thus must be restrained from rotating as above-described. Also, in the usual installation, pulp bales should all be rotated in the same direction and therefore, the turntable rotating mechanism must be returned to its initial position while the turntable is in a lowered fixed position. In an unusual pulp bale conveying installation or in some other conveying installation, the raised turntable might be satisfactorily alternately rotated counterclockwise and clockwise, thereby eliminating the need for returning the turntable rotating mechanism to its original position when the turntable is in lowered position. Or the lowered turntable might be satisfactorily rotated in a lowered position when the turntable rotating mechanism is returned to its initial position.

It is believed that the invention will have been clearly understood from the foregoing detailed description of my now preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows.

1. Apparatus for rotatably turning an object in a conveyor line which comprises a turntable and a vertical traverse rod axially connected to said turntable and depending therefrom and an indexing member on a lower end section thereof; means for raising said turntable under an object-to-be-rotated and lifting such object free of said conveyor line and for lowering said turntable to deposit said object on said conveyor line after rotation of said object; and means for rotating said turntable in raised position comprising a rotatable cylinder concentrically enclosing an intermediate section of said transverse rod and having a horizontal lever flange extending outwardly therefrom, a semi-cylindrical member depending from said horizontal flange, and means on said semi-cylindrical member for engaging said indexing member with said semi-cylindrical member for concurrent rotation, and means connected to said horizontal lever flange for turning said horizontal lever flange and rotating said turntable when said turntable is in a raised position.

2. Apparatus for rotatably turning an object in a conveyor line which comprises a turntable, a vertical traverse rod axially connected to said turntable and depending therefrom, and an indexing cylinder on a lower end section of traverse rod provided with longitudinal grooves in the periphery thereof; means for raising said turntable under an object-to-be-rotated and lifting such object free of said conveyor line and for lowering said turntable to deposit said object on said conveyor line after rotation, such means comprising a lift member to which said turntable is rotatably journalled, fluid-actuated means on opposite sides of said lift member for raising said lift member above the elevation of said conveyor line, and means connected to said lift member and to said fluid-actuated means for transferring lifting force from said fluid actuated means to said lift member; and means for rotating said turntable in raised position comprising a rotatable cylinder concentrically enclosing an intermediate section of said traverse rod end having a horizontal lever flange extending outwardly therefrom and a semi-cylindrical member depending from said lever flange, cam followers on said semi-cylindrical member adapted to engage the grooves in said indexing cylinder when said turntable is in raised position, first and second fluid operated cylinder and piston rod assemblies having piston rods pivotally connected to said lever flange; and fluid supply means for supplying fluid to the first cylinder to longitudinally shift the first cylinder rod and rotate said lever flange and for exhausting fluid from said second cylinder as the second cylinder rod longitudinally shifts as a result of rotation of said lever flange.

3. Apparatus according to claim 2 including means at a lower elevation that said cam followers for engaging said indexing means when said turntable is lowered to prevent rotation of said turntable in lowered position; and wherein said turntable rotating means is adapted to return to its initial position when said turntable is in lowered position.

4. Apparatus for rotatably turning an object in a conveyor line which comprises a turntable; means for raising said turntable under an object to be rotated and lifting such object free of said conveyor line and for lowering said turntable to deposit said object on said conveyor line after rotation of said object; and means for rotating said turntable comprising lever means engaged to rotate said turntable when the latter is in a raised position and fluid-operated actuating means including first and second fluid cylinders having blind ends mounted to fixed pivots and rod ends pivotally connected to said lever means, said cylinders being so positioned and fluid coupled that said first cylinder exerts maximum turning leverage to initiate turntable rotation at the onset thereof and a minimum turning lever at the end thereof and that said second cylinder exerts minimum opposing leverage to resist turntable rotation at the onset thereof and maximum opposing leverage at the end thereof.

5. Apparatus according to claim 4 wherein said turntable rotating means includes indexing means connected to and vertically movable with said turntable and adapted to rotatably engage said lever means with said turntable only when said turntable is in raised position such that said cylinders can be recycled to their original position when said turntable is lowered without rotating said turntable.

6. Apparatus for rotatably turning an object in a conveyor line which comprises a turntable; means for raising said turntable under an object to be rotated and lifting such object free of said conveyor line and for lowering said turntable to deposit said object on said conveyor line after rotation of said object; and means for rotating said turntable only when said turntable is in raised position comprising rotatable lever means, fluid-operated actuating means including fluid cylinders connected to said lever means and indexing means connected to and vertically movable with said turntable and adapted to rotatably engage said lever means with said turntable only when said turntable is in raised position such that said turntable is rotatable only in raised position by said actuating means and only in one direction.

References Cited

UNITED STATES PATENTS

| 2,785,809 | 3/1957 | Riblet. | |
| 2,833,557 | 5/1958 | Palmiter | 214—730 X |
| 3,100,039 | 8/1963 | Oderman et al. | |
| 3,168,206 | 2/1965 | Washington | 214—512 |
| 3,295,660 | 1/1967 | Nelson. | |

ALBERT J. MAKAY, *Primary Examiner.*

U.S. Cl. X.R.

198—33